Patented Jan. 12, 1926.

1,569,339

UNITED STATES PATENT OFFICE.

WILLIAM MALCOLM SINCLAIR, OF STRATHFIELD, NEAR SYDNEY, NEW SOUTH WALES, AUSTRALIA.

PROCESS OF MANUFACTURE OF ALDEHYDES, OILS, AND ORGANIC ACIDS FROM CACTI.

No Drawing.  Application filed February 25, 1925.  Serial No. 11,406.

*To all whom it may concern:*

Be it known that I, WILLIAM MALCOLM SINCLAIR, subject of the King of Great Britain and Ireland, residing at Moseley Street, Strathfield, near Sydney, New South Wales, Australia, have invented new and useful Improvements in Processes of Manufacture of Aldehydes, Oils, and Organic Acids from Cacti, of which the following is a specification.

This invention consists in the manufacture of aldehydes, essential oils and organic acids from "prickly pear" and other cacti. Alcohol and other conversion products may be produced from these aldehydes.

The Opuntias are an ideal fermentable medium in their natural state, and maximum results are obtained in utilizing them for the manufacture of aldehydes if water is not added to the mash. The yield of aldehydes for a given weight of pear is inversely proportional to the amount of any water which may be added to the mash. Maximum yield is obtained when the pear substance is fermented in the natural state, provided that the vitality of the plant is reduced sufficiently to allow complete invasion of its substance by the organism used. Pulping by passing between rolls effectively reduces the vitality. The whole or any part of the substance of the pear plant is used in the process.

The fermenting organism by which the pear substance is attacked is a type of fungus indigenous in the pear. The presence of this organism is indispensable to the pear in the natural conditions in which it operates to convert humus in the soil into food suitable for the pear, and also to convert into pear food any pear which for any reason has had its vitality reduced below a certain level. The conversion is so rapid and complete that in a comparatively short time depleted pear is made available as food for new pear growth. Thus living pear is maintained naturally in robust condition, and a supply of food for new growth is always assured. Aldehydes are a by-product in the growth of the pear and these aldehydes heretofore have been wholly disregarded and lost. Their presence is easily demonstrable in any rotten pear irrespectively of the method employed for the destruction of such pear.

In utilizing the fermentative action of these natural organisms on the pear, care is taken that the operative conditions are not such as will inhibit or substantially diminish the growth and reproduction of these organisms. The presence of these organisms has not heretofore been observed and they are unnamed. They vary somewhat in different localities even in the same type of pear. They appear to be main factors in the acclimatization of the pear, which does not spread until the soil surrounding is suitably prepared for its growth by infection of the soil by these organisms when the pear grows vigorously, and spreads rapidly.

Hitherto prickly pear and like cacti have been regarded as containing over 90% water, but the fact is not so. The water which is present in the pear is in molecular combination, and cannot be separated as water, without involving destruction of pear tissue and loss of energy, thus proving that the water is bio-chemically combined in pear and not free. The known observations on its water content were made when the delicate colloid of the pear was first broken down by some agency such as heat. This colloid if used as nature supplies it, the growth-vitality of the pear only being destroyed, is a source of energy which can be made available for industrial uses through the operation of indigenous germs, and supplied in a form convenient for use as a fuel in internal combustion engines. It is a rapid chemical device for harnessing solar energy by plant metabolism, and it is peculiarly profitable in its nature for the reason that the plant can be grown in soil and under conditions which are too poor to grow any useful crop. Apparently it is not necessary to cultivate the fungus apart from the pear, which is its natural host, although this can be done. Improved results are attained when the culture is pure. Its activities and those of other fungi which can be grown on the pear by special means go to prove that the energy is represented in the form of a substituted hydroxyl acid known as mesoxalic acid. Pear protoplasm apparently consists of little else than this acid associated with calcium, other ingredients, such as potassium, nitrogen, sulphur and phosphorus being present in small but essential proportions. A moiety of essential oil of the pear is set free in the process. Two facts are thus accounted for—(1) the property of cacti as a fermentable substance for the right organism, as it contains the necessary nitrogen and phosphorus in favorable proportions, and (2) its ability to grow in very poor soil, as its chlorophyll apparatus can supply the mesoxalic acid from the atmosphere around it, by using oxygen, water, and carbon dioxide, lime being present in most poor soils. No great drain on the soil is made by pear, which leaves it in good condition for subsequent culture of any useful plants such as cereals which are not adversely affected by pear flora.

In carrying out the process the pear or other cactus is collected, pulped by passing it between rolls or by any other suitable mechanical method, and passed into a closed vat, preferably of spherical or conical shape and offering adequate gas space above the pulp to permit the even working of the ferment. Means are provided for controlling the escape of gas evolved during fermentation and for controlling the pressure at the point about which the best fermentation is obtained. The fungus will not work in an acid medium but only in an acid-salt medium. The walls of the vat must contain no material which would tend to upset the balance of the acid salts present in the pear, and if of wood they must be as free as possible of any adverse essential oils or adverse flora. Wood with practically no essential oil such as boxwood is therefore required; glass or glass lined vessels or iron vessels may be used, but vessels of zinc or copper are very detrimental but are much improved by tinning. The presence of any antiseptics must be avoided and clean conditions maintained. The timber of any tree found to be attacked by the fungal flora of the pear might be used in the construction of the apparatus; certain species of Eucalypti for instance.

The mash is maintained at a suitable temperature (between 20° C. and 35° C.) undisturbed for about five days more or less, when gas evolution will reach a maximum or will have begun to lessen.

The vat is agitated once or twice daily according to the reaction condition. On approximately the seventh day, or when agitation produces no increased gas evolution, and when gas evolution is reduced to a minimum or ceases, and a brown slime is well developed, the pulp is ready for the separation of the aldehyde. The aldehyde is then present in the pulp either as such in solution in the limited amount of water present, or in one of its polymeric modifications, or combined with a base and associated with essential oil of the pear.

Dilute sulphuric acid or other suitable hydrolyzer is first added up to 1% of the whole volume of the pulp, and the pulp is then distilled at a suitable temperature, up to 125° C., care being taken not to apply heat too suddenly or to bring the temperature up too high so that aldehyde would be decomposed. The aldehyde comes over mixed with water and small proportions of sulphuric acid and is passed through a condensing apparatus and collected at as low a temperature as possible (about 15° C.) in conditions favoring rapid polymerization, resulting partly from the action of the dilute sulphuric acid and partly because of the conditions in which it existed in the pear or in dilute solution in water. When the proportion of aldehyde distilling over falls below a certain point arbitrarily determined, the treatment is arrested and the residues are retreated. The essential oil is separated by decantation or other known means from the distillate, in which it is contained. They are first sedimented. A proportion of aldehyde separates in a solid polymeric form, with organic acids (viz: tartaric and gallic acids) and is collected and the supernatant liquid is decanted when cooled. The sediment is then distilled with a minimum of dilute sulphuric acid and the aldehyde collected as before. The organic acids are then separated by filtering. The aldehyde residue in the filtrate is now precipitated by alkalinization and is removed by filtration and distilled with dilute sulphuric acid and the aldehyde which comes over is collected as for other moieties, the salts of above-named acids being crystallized and separated.

For the production of alcohol the aldehyde is reduced by passing it into a stream of hydrogen through metal tubes which are heated under controls which ensure that the temperature will not become high enough to decompose the aldehyde (140° C. optimum) and by passing the hydrogen diluted stream over a catalyst consisting of nickel in a finely divided state the aldehyde absorbs some of the hydrogen which is thus brought into nascent condition, and is thus converted into its corresponding alcohol (e. g.)

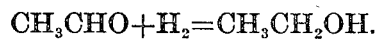
$$CH_3CHO + H_2 = CH_3CH_2OH.$$

The hydrogen is recirculated until all is used up, but an excess of hydrogen to aldehyde is always maintained, and the whole of the gases are passed through a condensing apparatus surrounded by cold circulating water at shaded earth temperature, so that the alcohol is condensed as a liquid and collected. By "shaded earth temperature" is meant the lowest temperature which can be secured by natural means, such as screenings from the direct rays of the sun, and without recourse to artificial cooling means such, for instance, as freezing. To prevent the undue formation of ether a minimum of oxygen (0.3% to 3%) is circulated with the hydrogen and aldehyde stream.

The indicated quantities and measurements are to be regarded as approximate only and for purposes of reference, and they are not in any way to be regarded as fundamental or fixed figures.

What I claim as my invention and desire to secure by Letters Patent is;—

1. A process for the obtaining of aldehydes from cacti which consists in mashing the same without adding water in conditions favorable to fermentation by its indigenous fungus, hydrolyzing the fully fermented pulp, distilling the fermented hydrolyzed pulp, condensing the aldehyde, and separating essential oil from the aldehyde.

2. A process in continuation of the process defined in claim 1, which consists in filtering the distillation residue while hot, sedimenting, decanting the liquid, acidifying the sediment, distilling and condensing the aldehyde, and separating organic acids.

3. A process in serial continuation of the process defined in claim 1 which consists in filtering the distillation residue while hot, alkalinizing the filtrate liquor, removing the precipitate, acidifying, distilling and condensing the aldehyde distillate, and crystallizing out salts of organic acids.

4. The process defined in claim 1, which is characterized in that direct fermentation of the mash to produce aldehydes is effected in a pure culture of the indigenous fungi carried on the plant.

5. A process of treating cacti for the purpose inter alia of obtaining its essential oil, which consists in mashing without water in conditions favorable to fermentation by indigenous fungus, hydrolyzing the pulp, distilling the pulp, and decanting the essential oil from the aldehyde distillate.

6. A process for the commercial utilization of prickly pear and like cacti, which is characterized by the production of aldehydes by mashing the same without the addition of water and without introducing any fermenting agent other than that inhabiting the plant in its natural condition, hydrolyzing the mash, distilling, and condensing the aldehyde product.

7. A process according to claim 6 carried out in the conditions of temperature and in the steps and time periods described in the foregoing specification.

8. A process in continuation of the process defined in claim 6, which consists in alkalinizing the residues and obtaining salts of organic acids therefrom by crystallization.

In testimony whereof I affix my signature.

WILLIAM MALCOLM SINCLAIR.